Jan. 3, 1956     P. LETRILLIART     2,729,782
FREQUENCY CONVERTOR GROUPS
Filed Oct. 30, 1951

INVENTOR
Pierre Letrilliart
By Shoemaker & Mattare
ATTORNEYS

United States Patent Office 2,729,782
Patented Jan. 3, 1956

2,729,782

FREQUENCY CONVERTOR GROUPS

Pierre Letrilliart, Jeumont, France, assignor to Forges et Ateliers de Constructions Electriques de Jeumont, Paris, France, a French body corporate Application October 30, 1951, Serial No. 253,787

Claims priority, application France November 7, 1950

7 Claims. (Cl. 321—63)

This invention relates to the conversion of the supply-frequency in feeding an electrical load by means of a convertor group. As disclosed in the application Serial No. 81,518, filed March 15, 1949, which has matured into Patent No. 2,585,392, such a convertor group may comprise a driving motor and a rotary frequency changer provided with an intermediate rotor.

The present invention has for its main object to obtain substantially the same results of converting single-phase current to polyphase, and vice versa, and/or changing the frequency as desired, by means of machines of normal construction, that is to say machines dispensing with the intermediate rotor.

A specific object of the invention is to provide an improved frequency convertor group, intended to convert alternating current at a given constant frequency into polyphase current having successively a plurality of output frequencies within a wide range, said group being constituted by two similar asynchronous machines of the conventional type with slip-ring rotors coupled mechanically together so that one can drive the other, and a synchronous machine fed by the single-phase supply system, this last machine being connected as a primary synchronous polyphase balancer in order to feed one or both of said asynchronous machines with polyphase current of constant frequency.

The interconnection of the two asynchronous machines with the external load and with the synchronous machine can be effected in various ways, in combination with the inversion and the changing of the pole number of at least one of the machines of the group; in this way there can be obtained several relative speeds of rotation of the group, corresponding to different output frequencies.

The objects and advantages of the invention will be better understood by referring to the annexed drawing and to its description which relate to one example of carrying it into effect. In this drawing, Fig. 1 is a simplified diagram of a convertor group arranged according to the invention, and Figs. 2 to 6 represent different examples of interconnection of this group to secure successively higher output frequencies.

Figure 1:
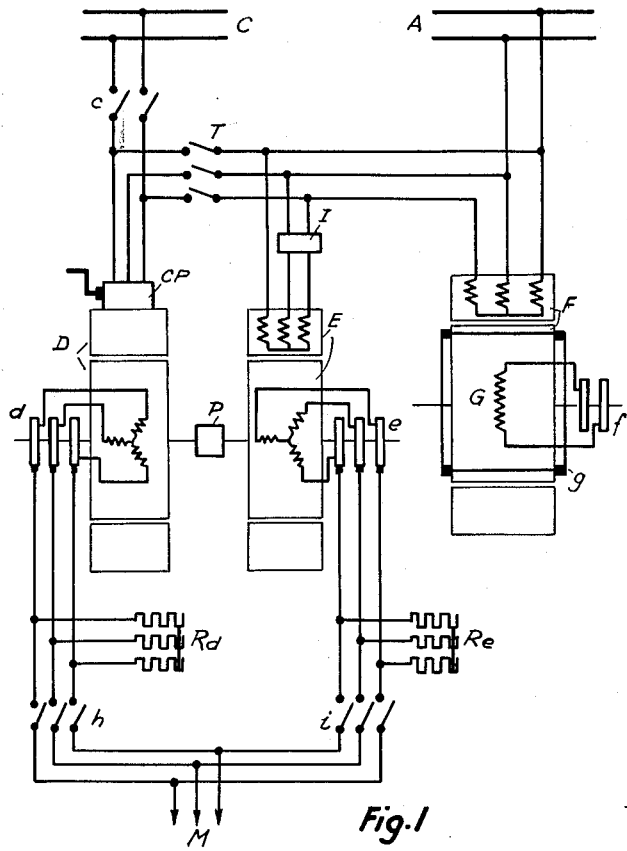

Fig. 1 shows an asynchronous machine D having a wound rotor with a suitable number of slip rings $d$ connected to a rheostat $Rd$. It will be assumed that this machine has a three-phase wound stator provided with a pole-number changing device CP, whereby the number of poles can be either $2p$ or $4p$, $p$ being for example equal to 1; this stator can be wound two-phase or for any other number of phases.

The rotor of the machine D is mechanically coupled, directly or by means of an adjustable-ratio transmission P, to the rotor of an analogous machine E, which comprises slip rings $e$ connected to a rheostat $Re$. It will be assumed that the machine E comprises for example four poles, this number being fixed.

The stator windings of the machine D can be energized by direct current from a direct-current source C, by closing the switch $c$; it can, alternatively, be fed with polyphase current (50 cycle three-phase current for example) from the stator windings of a machine F, by means of the switch T. The stator of the machine D may include devices for correcting the balance of phases, as described in the co-pending application Serial No. 251,768, filed October 17, 1951, now Patent No. 2,689,324.

The stator windings of the machine E are connected permanently to the stator windings of the machine F, which is a normal synchronous machine, having a rotor winding G, energized by direct current through the rings $f$, and a squirrel-cage $g$. A part of the stator windings of the machine F is connected, as represented, to a single-phase supply system A. A reverser I is inserted in the feed of one of the machines D or E, for example in that of the machine E.

The slip rings $d$ and $e$ of the asynchronous machines D and E, in addition to their connection to the slip rheostats $Rd$ and $Re$ respectively, can be connected by means of selective switches $h$ and $i$ respectively to an external load M, consisting for example of traction or other motors having a squirrel-cage or a double-cage winding, not shown.

To begin with, the synchronous machine F is started by any suitable means, such as an auxiliary phase with inductance, capacity or resistance, a conventional starting motor, an auxiliary group for polyphase feed at constant or variable frequency or other known device. When it has attained its normal synchronous running condition, the machine F furnishes to the stator of the machine E a polyphase current operating as phase balancer. That allows of starting the machine E with its full torque by means of its slip rheostat $Re$.

Figure 2:
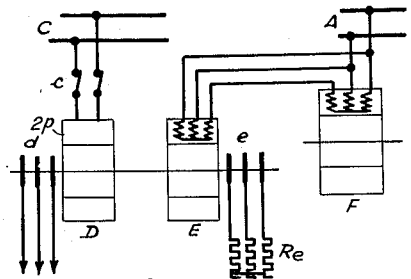

As shown in Fig. 2, the machine D is energized by direct current by closing the switch $c$ and the machine E is thus started. Having four poles, the machine E attains a speed of approximately 1500 revolutions per minute. The machine D, coupled by means of the pole-changer CP to have two poles, works as a two-pole alternator at 1500 revolutions per minute and produces at its rings a frequency of 25 cycles per second. Upon closing the switch $h$ of Fig. 1, there is furnished therefore to the load motors M a starting frequency which rises progressively from 0 to 25 cycles; these motors thus attain their first normal operating speed.

Figure 3:
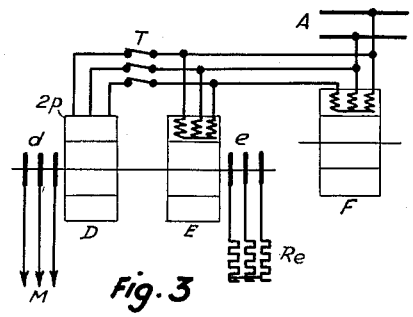

An analogous result can be obtained according to Fig. 3. The machine D is first of all coupled to have four poles and connected to the machine E by the switch T. Its field then rotates at 1500 revolutions per minute, the machine E rotating in the same direction and at the same speed, and the frequency at the rings $d$ being nil. Upon then changing to the coupling of the machine D with two poles, there is obtained a slip of 1500 revolutions per minute and a frequency of 25 cycles per second at the rings $d$.

It is to be noted that the diagram of Fig. 2 presents the advantage of allowing the convenient adjustment of the voltage which can be modified by regulating the direct current energization of the machine D.

Figure 4:
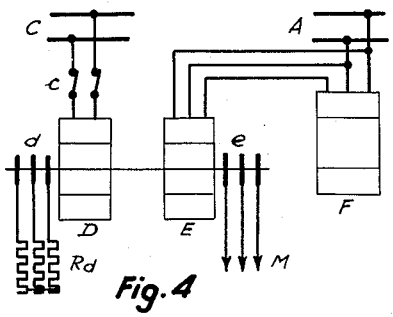

As shown in Fig. 4, the machine D is energized by direct current and the rheostat $Rd$ is progressively short-circuited, the slip rings $e$ being connected to the load motors M by means of the switch $i$ of Fig. 1. The machines D and E are rendered practically stationary, and the machine E acts as a static transformer, furnishing to the load motors M a three-phase current at 50 cycles per second; the motors M thus attain their second normal speed. It is also possible to collect this same frequency directly from the stator of the machine E.

Figure 5:
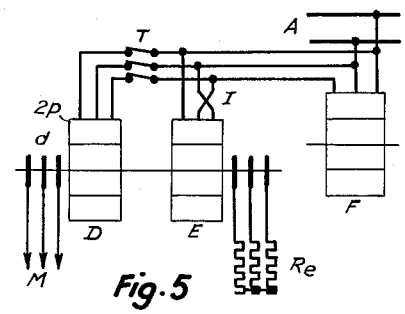

Fig. 5 is analogous with Fig. 3, but the stator connections of one of the asynchronous machines are crossed, for example those of the machine E, which causes it to rotate in the opposite direction at 1500 revolutions per minute. The machine D being coupled for two poles, its field, fed by means of the switch T, rotates at 3,000 revolutions per minute. The relative speed of the rotor of the machine D in relation to the field is therefore 4500 revolutions per minute, which for a two-pole machine corresponds to a frequency of 75 cycles per second at its rings $d$; this represents the third speed of the load motors M.

Figure 6:
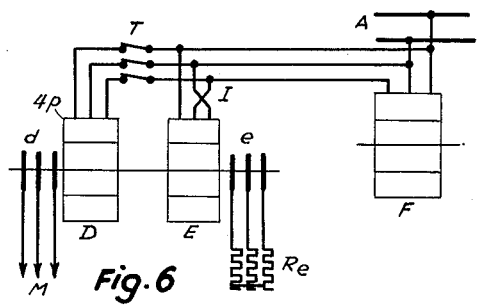

Lastly, as shown in Fig. 6, the machine D is coupled for four poles, its field therefore rotating at 1500 revolutions per minute, in the direction opposite to that of its rotor, which is driven by the machine E at 1500 revolutions per minute; the relative speed of this rotor in relation to the field being thus 3000 revolutions per minute, there is obtained, with four poles, at the rings $d$ a frequency of 100 cycles per second which corresponds to the fourth speed of the load motors M.

It is obvious that it is likewise possible to effect the inversion of the field of the machine D and to change the number of poles of the machine E, which allows of realizing other ranges of speeds and other modes of operation. It is likewise possible to cause the intervention of the transmission P of Fig. 1 in order to modify the ratio of the speeds of the machines D and E, as well as to modify the number of poles of the load motors M.

What I claim is:

1. A frequency convertor group for producing successively a plurality of polyphase output frequencies within a wide range, comprising two similar polyphase induction machines of the conventional type with slip-ring rotors, said rotors being mechanically coupled together, two rheostats connected separately to said rotors, a pole-changing device for the stator windings of the first of said induction machines, a reverser for the stator windings of the second machine, an interconnecting switch between the stator windings of the respective induction machines, selective switching means for connecting said slip-ring rotors to a polyphase load, means for energizing the stator windings of at least one of said induction machines by direct current and means for energizing the stator windings of both said induction machines by polyphase current of constant frequency.

2. In a frequency convertor group according to claim 1, means for energizing said group by polyphase current from a single-phase power system, comprising a separate polyphase synchronous machine energized by said single-phase power system, the stator windings of said synchronous machine being connected as a primary phase-balancer to supply the stator windings of at least one of said induction machines with polyphase power of constant frequency.

3. In a frequency convertor group according to claim 1, an interconnection of said group, in which the first induction machine has its stator windings connected for supply with direct current in order to operate as alternator, and the second induction machine has its stator windings connected for supply with polyphase current of constant frequency in order to operate as driving motor for said alternator, the rotor of the first machine being connected to supply polyphase current to an external load at a first-step frequency.

4. In a frequency convertor group according to claim 1, an interconnection of said group, in which both induction machines have their stator windings connected for supply with constant frequency polyphase current, the rotor of the first induction machine being connected as frequency changer for supply of polyphase current to an external load at a first-step frequency, and the rotor of the second induction machine being connected to a rheostat, whereby said second machine operates as a polyphase motor driving said first machine.

5. In a frequency convertor group according to claim 1, an interconnection of said group, in which the first induction machine has its stator windings connected for supply with direct current, and its rotor connected to a progressively short-circuited rheostat, whereby this first machine is brought to rest as a short-circuited alternator, while the second induction machine has its stator windings connected for supply with polyphase current of constant frequency, its rotor being connected to an external load, whereby said second induction machine operates as a transformer delivering polyphase current of a second-step frequency to a polyphase load.

6. In a frequency convertor group according to claim 1, an interconnection of said group, in which both induction machines have their stator windings connected to be energized by polyphase current of constant frequency, the stator connections of the second induction machine being crossed by said reverser, the rotor of the first induction machine is connected to an external load in order to operate as a frequency-changer producing a polyphase output of third-step frequency, and the rotor of the second induction machine is connected to a rheostat in order to operate as a polyphase motor driving said first induction machine.

7. In a frequency convertor group according to claim 1, an interconnection of said group, in which both induction machines have their stator windings connected to be energized by polyphase current of constant frequency, the first of said machines having its stator windings coupled by said pole-changing device to provide an increased number of poles, and the stator connections of the second of said machines being crossed by said reverser, the rotor of the first induction machine is connected to an external load in order to operate as a frequency-changer producing a polyphase output of fourth-step frequency, and the rotor of the second induction machine is connected to a rheostat in order to operate as a polyphase motor driving said first induction machine.

References Cited in the file of this patent

UNITED STATES PATENTS

| | | |
|---|---|---|
| 615,673 | Bradley | Dec. 13, 1898 |
| 1,808,435 | Punga | June 2, 1931 |
| 2,137,989 | Rossman | Nov. 22, 1938 |
| 2,287,603 | Clymer | June 23, 1942 |
| 2,585,392 | Letrilliart et al. | Feb. 12, 1952 |